United States Patent
Whittaker et al.

(10) Patent No.: US 11,151,147 B1
(45) Date of Patent: *Oct. 19, 2021

(54) DATA MINING MANAGEMENT SERVER

(71) Applicant: Cognizant Technology Solutions U.S. Corporation, College Station, TX (US)

(72) Inventors: Thomas Edward Whittaker, Wanda, MN (US); Robert William Baynes, Jr., Hingham, MA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 104 days.

This patent is subject to a terminal disclaimer.

(21) Appl. No.: 16/590,190

(22) Filed: Oct. 1, 2019

Related U.S. Application Data (63) Continuation of application No. 15/255,006, filed on Sep. 1, 2016, now Pat. No. 10,430,429.

(Continued)

(51) Int. Cl.
*G06F 16/30* (2019.01)
*G06F 16/2458* (2019.01)
(Continued)

(52) U.S. Cl.
CPC ......... *G06F 16/2465* (2019.01); *G06F 16/25* (2019.01); *G06N 3/126* (2013.01); *G06N 20/00* (2019.01)

(58) Field of Classification Search
CPC ... G06F 16/2465; G06F 16/25; G06F 16/2365
(Continued)

(56) References Cited

U.S. PATENT DOCUMENTS

| 5,761,381 A | 6/1998 | Arci et al. |
| 5,845,266 A | 12/1998 | Lupien et al. |

(Continued)

FOREIGN PATENT DOCUMENTS

| CN | 1294356 | 5/2001 |
| CN | 1808483 | 7/2006 |

(Continued)

OTHER PUBLICATIONS

Koza, "Genetic Programming: On the Programming of Computers by Means of Natural Selection", Dec. 1992, MIT Press, pp. 1-609.

(Continued)

*Primary Examiner* — Sana A Al-Hashemi
(74) *Attorney, Agent, or Firm* — Dawn-Marie Bey; Bey & Cotropia PLLC (57) ABSTRACT

A system for outputting an action signal to a controlled system is provided. The system includes a memory storing individuals to be deployed to a production environment as an actor, wherein each of the individuals has a rule associated therewith for asserting an action, and the actor includes one or more individuals, is associated with the controlled system and is configured to transmit an intermediate action signal for asserting the action. The system includes a management server configured to receive the intermediate action signal, select, from a set of available operations, a selected operation to perform with respect to the intermediate action signal, and the set of available operations including allowance and a blocking of the intermediate action signal. Further, in response to the selected operation being the allowance, transmitting the intermediate action signal, and in response to the selected operation being the blocking, blocking the intermediate action signal.

18 Claims, 5 Drawing Sheets

Related U.S. Application Data (60) Provisional application No. 62/213,063, filed on Sep. 1, 2015.

(51) Int. Cl.
  *G06N 20/00* (2019.01)
  *G06N 3/12* (2006.01)
  *G06F 16/25* (2019.01)

(58) Field of Classification Search
  USPC ........ 707/609, 687, 705, 769, 790, 813, 821
  See application file for complete search history.

(56) References Cited

U.S. PATENT DOCUMENTS

| | | | |
|---|---|---|---|
| 5,920,848 A | 7/1999 | Schutzer et al. | |
| 5,930,780 A | 7/1999 | Hughes et al. | |
| 6,240,399 B1 | 5/2001 | Frank et al. | |
| 6,249,783 B1 | 6/2001 | Crone et al. | |
| 6,816,846 B1 | 11/2004 | Back et al. | |
| 7,013,344 B2 | 3/2006 | Megiddo | |
| 7,246,075 B1 | 7/2007 | Testa | |
| 7,370,013 B1 | 5/2008 | Aziz et al. | |
| 7,444,309 B2 | 10/2008 | Branke et al. | |
| 7,830,387 B2 | 11/2010 | Pronovost et al. | |
| 8,527,433 B2 | 9/2013 | Hodjat et al. | |
| 8,639,545 B2 | 1/2014 | Cases et al. | |
| 8,768,811 B2 | 7/2014 | Hodjat et al. | |
| 8,909,570 B1 * | 12/2014 | Hodjat | G06F 16/2465 706/13 |
| 10,628,553 B1 * | 4/2020 | Murrish | G06F 16/2365 |
| 2002/0002502 A1 | 1/2002 | Maes et al. | |
| 2002/0019844 A1 | 2/2002 | Kurowski et al. | |
| 2002/0062296 A1 | 5/2002 | Nikisa | |
| 2003/0158887 A1 | 8/2003 | Megiddo | |
| 2003/0233304 A1 | 12/2003 | Dhurandhar et al. | |
| 2004/0039716 A1 | 2/2004 | Thompson | |
| 2004/0210545 A1 | 10/2004 | Branke et al. | |
| 2004/0212545 A1 | 10/2004 | Li et al. | |
| 2004/0249791 A1 | 12/2004 | Waters et al. | |
| 2004/0254901 A1 | 12/2004 | Bonabeau et al. | |
| 2005/0010502 A1 | 1/2005 | Birkestrand et al. | |
| 2005/0033672 A1 | 2/2005 | Lasry et al. | |
| 2005/0187848 A1 | 8/2005 | Bonissone et al. | |
| 2005/0198103 A1 | 9/2005 | Ching | |
| 2006/0020439 A1 | 1/2006 | Kelkar et al. | |
| 2006/0026175 A1 * | 2/2006 | Aggarwal | G06K 9/6229 |
| 2007/0100907 A1 | 5/2007 | Bayer | |
| 2007/0143198 A1 | 6/2007 | Brandes et al. | |
| 2007/0143759 A1 | 6/2007 | Ozgur et al. | |
| 2007/0150435 A1 | 6/2007 | Murakawa et al. | |
| 2007/0185990 A1 | 8/2007 | Ono et al. | |
| 2008/0071588 A1 | 3/2008 | Eder | |
| 2008/0228644 A1 | 9/2008 | Birkestrand et al. | |
| 2009/0125370 A1 | 5/2009 | Blondeau et al. | |
| 2009/0307638 A1 | 12/2009 | McConaghy | |
| 2009/0327178 A1 | 12/2009 | Jacobson | |
| 2010/0030720 A1 | 2/2010 | Stephens | |
| 2010/0182935 A1 | 7/2010 | David | |
| 2010/0256795 A1 | 10/2010 | McLaughlin et al. | |
| 2010/0257228 A1 | 10/2010 | Staggs et al. | |
| 2010/0257605 A1 | 10/2010 | McLaughlin et al. | |
| 2010/0274736 A1 | 10/2010 | Hodjat et al. | |
| 2010/0274742 A1 | 10/2010 | Hodjat et al. | |
| 2010/0293119 A1 | 11/2010 | Ferringer et al. | |
| 2011/0161264 A1 | 6/2011 | Cantin | |
| 2011/0246834 A1 | 10/2011 | Rajashekara et al. | |
| 2012/0239517 A1 | 9/2012 | Blondeau et al. | |
| 2012/0239592 A1 | 9/2012 | Esbensen | |
| 2013/0124440 A1 | 5/2013 | Hodjat et al. | |
| 2013/0254142 A1 | 9/2013 | Hodjat et al. | |
| 2014/0006316 A1 | 1/2014 | Hodjat et al. | |
| 2016/0283563 A1 | 9/2016 | Hodjat et al. | |
| 2018/0032997 A1 * | 2/2018 | Gordon | G06Q 30/0269 |

FOREIGN PATENT DOCUMENTS

| | | |
|---|---|---|
| CN | 1902646 | 1/2007 |
| CN | 101018192 | 8/2007 |
| CN | 120737126 G | 10/2012 |
| EP | 0762294 | 3/1997 |
| EP | 1096400 | 5/2001 |
| EP | 2422276 | 2/2012 |
| EP | 2422278 | 2/2012 |
| JP | H08-110804 | 4/1996 |
| JP | H09114797 | 5/1997 |
| JP | 2001325041 | 11/2001 |
| JP | 2003044665 | 2/2003 |
| JP | 2004240671 | 8/2004 |
| JP | 2004302741 | 10/2004 |
| JP | 2005190372 | 7/2005 |
| JP | 2006523875 | 10/2006 |
| JP | 2007207173 | 8/2007 |
| JP | 2007522547 | 8/2007 |
| JP | 2008129984 | 6/2008 |
| KR | 101474704 | 12/2014 |
| RU | 2142158 | 11/1999 |
| RU | 2161819 | 1/2001 |
| RU | 2245578 | 1/2005 |
| RU | 2294561 | 2/2007 |
| RU | 2301498 | 6/2007 |
| TW | 200947225 | 11/1999 |
| TW | 200303474 | 9/2003 |
| TW | 200945233 | 11/2009 |
| WO | WO 2001/013105 | 2/2001 |
| WO | WO 2005/073854 | 8/2005 |
| WO | WO 2009/062090 | 5/2009 |
| WO | WO 2010/120440 | 10/2010 |
| WO | WO 2010/127039 | 11/2010 |
| WO | WO 2010/127042 | 11/2010 |

OTHER PUBLICATIONS

Gaspar-Cunha et al., "A Multi-Objective Evolutionary Algorithm Using Neural Networks to Approximate Fitness Evaluations," Int'l J. Computers, Systems and Signals, 6(1) 2005; pp. 18-36.

Kosorukoff, "Using incremental evaluation and adaptive choice of operators in a genetic algorithm," Proc. Genetic and Evolutionary Computation Conference, GECCO—Sep. 2002, 7pp.

Whitehead, "Genetic Evolution of Radial Basis Function Coverage Using Orthogonal Niches," IEEE Transactions on Neural Networks, 7:6, (Nov. 1996) 1525-28.

Ducheyne et al., "Is Fitness Inheritance Useful for Real-World Appications?" Evolutionary Multi-Criterion Optimization, ser. LNCS 2631, Spring 2003, pp. 31-42.

Enee et al., "Classifier Systems Evolving Multi-Agent System with Distributed Elitism," Proc. 1999 Congress on Evolutionary Computation (CEC'99) vol. 3:6, Jul. 1999, pp. 1740-1746.

Gopalakrishnan et al., "Optimal Sampling in a Noisy Genetic Algorithm for Risk-Based Remediation Design," Bridging the gap: meeting the world's water and environmental resources challenges, Proc. World Water Congress 2001, 8 pp.

Bongard et al., "Guarding Against Premature Convergence while Accelerating Evolutionary Search," Proc. 12th annual conf. of Genetic and evolutionary computation, Jul. 2010, 8 pages.

Akbarzadeh et al., "Friendship Modeling for Cooperative Co-Evolutionary Fuzzy Systems: A Hybrid GA-GP Algorithm," Proc. 22nd Int'l Conf. of N. American FIPS, Jul. 2003, pp. 61-66.

Myers et al., Response Surface Methodology: Process and Product Optimization Using Designed Experiments, John Wiley and Sons, Inc., New York, 1995, 12 pages.

Sakauchi et al., UNIFINE: A Next Generation Financial Solution System of Nihon Unisys Ltd., Technology Review UNISYS, Japan, Nihon Unisys Ltd., Feb. 28, 2006, vol. 25, No. 4, 5 pages.

Schoreels et al., "Agent based Genetic Algorithm Employing Financial Technical Analysis for Making Trading Decisions Using Historical Equity Market Data," IEEE/WIC/ACM International Conference on Intelligent Agent Tethnology (IAT2004), Beijing, China, Sep. 20-24, 2004, pp. 421-424.

(56) References Cited

OTHER PUBLICATIONS

Streichert, "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mita rb/streiche/publications/Introduction to E volutionary Algorithms.pdf).
Tanev et al., "Scalable architecture for parallel distributed implementation of genetic programming on network of workstations," J. Systems Architecture, vol. 47, Jul. 2001, pp. 557-572.
Ahn et al., "Elitism-Based Compact Genetic Algorithms"; 2003; IEEE; Transactions on Evolutionary Computation, vol. 7, No. 4; pp. 367-385.
Bartlett II et al., "Organizational Research: Determining Appropriate Sample Size in Survey Research," IT, Learning, and Performance Journal 19(1) Spring 2001, 8pp.
Bui et al., "Local models: An approach to distributed multi-objective optimization," Computational Optimization and Applications, vol. 42, No. 1, Oct. 2007, pp. 105-139.
Castillo et al., "Applications of multi-objective evolutionary algorithms in economics and finance: A survey," Proc. IEEE Congress on Evolutionary Computation, Sep. 2007, pp. 532-539.
Davarynejad, "Fuzzy Fitness Granulation in Evolutionary Algorithms for complex optimization," Master of Science Thesis, Ferdowsi Univ. of Mashhad, Jun. 2007, 30 pages.
Davarynejad et al., "A Novel General Framework for Evolutionary Optimization: Adaptive Fuzzy Fitness Granulation," CEC Sep. 2007, 6pp.
Fitzpatrick et al., "Genetic Algorithms in Noisy Environments," Machine Learning 3: 101-120, May 1988.
Freitas, "A review of evolutionary algorithms for data mining." Soft Computing for Knowledge Discovery and Data Mining, Springer US, 2008, pp. 79-111.
Georgilakis, "Genetic Algorithm Model for Profit Maximization of Generating Companies in Deregulated Electricity Markets," Applied Artificial Intelligence, Jul. 2009, 23:6,538-552.
Hodjat et al., "Chapter 5: Introducing an Age-Varying Fitness Estimation Function." Genetic Programming Theory and Practice X. Ed. Riolo el al., Springer Apr. 19, 2013, pp. 59-71.
Hornby, "A Steady-State Version of the Age-Layered Population Structure EA," Chapter 1 of Genetic Programming Theory and Practice VII, Riolo et al., editors, Springer 2009, 16pp.
Hornby, "ALPS: The Age-Layered Population Structure for Reducing the Problem of Premature Convergence," GECCO'06, Seattle, Jul. 2006, authored by an employee of the US Government, therefore in the public domain, 8pp.
Hornby, "Steady-State ALPS for Real-Valued Problems," GECCO'09, Montreal, Jul. 2009. Assoc. for Computing Machinery, 8pp.
Hornby, "The Age-Layered Population Structure (ALPS) Evolutionary Algorithm," ACM; GECCO Jul. 8-12, 2009; 7 pages.
Design lab, "ALPS—the Age-Layered Population Structure," UC Santa Cruz web article printed Mar. 17, 2011, 3 pp. (http://design.ucsc.edu/projects/alps.html).
Juille, "Evolution of Non-Deterministic Incremental Algorithms as a New Approach for Search in State Spaces," Proc. 6th Int'l Conf. on Genetic Algorithms, 1995, 8pp.
Laumanns et al., "A Unified Model for Multi-Objective Evolutionary Algorithms with Elitism"; 2000; IEEE; pp. 46-53.
León et al., "Parallel hypervolume-guided hyperheuristic for adapting the multi-objective evolutionary island model," Proc. 3rd Int'l Workshop on Nature Inspired Cooperative Strategies for Optimization Studies in Computational Intelligence, vol. 236, Nov. 2008, pp. 261-272.
López et al., "MRMOGA: Parallel evolutionary multiobjective optimization using multiple resolutions," Proc. IEEE Congress on Evolutionary Computation, vol. 3, Sep. 2005, pp. 2294-2301.
Mouret et al., "Encouraging Behavioral Diversity in Evolutionary Robotics: An Empirical Study," MIT, Evolutionary Computation 20(1):91-133, 2012.
Nelson, "Fitness functions in evolutionary robotics: A survey and analysis," Robotics and Autonomous Systems 57 (Apr. 30, 2009) 345-370.
Poli et al., "Genetic Programming: An introductory Tutorial and a Survey of Techniques and Applications," Univ. Essex School of Computer Science and Eletronic Engineering Technical Report No. CES-475, Oct. 2007, 112 pp.
Refaeilzadeh, P. et al., "Cross Validation" entry, Encyclopedia of Database Systems, eds. Özsu and Liu, Springer, 2009, 6pp.
Remde et al. "Evolution of Fitness Functions to Improve Heuristic Performance," LION Dec. 8-10, 2007 II, LNCS 5313 pp. 206-219.
Sacks et al., "Design and Analysis of Computer Experiments," Statistical Science 4:4, 1989, 409-435.
Salami et al., "A fast evaluation strategy for evolutionary algorithms," Applied Soft Computing 2/3F (Jan. 2003) 156-173.
Torresen, "A Dynamic Fitness Function Applied to Improve the Generalisation when Evolving a Signal Processing Hardware Architecture," Proc. EvoWorkshops 2002, 267-299 (12 pp).
Wu et al., "An incremental fitness function for partitioning parallel taks," Proc. Genetic and Evolutionary Computation Conf. (Aug. 2001) 8pp.

\* cited by examiner

DATA MINING MANAGEMENT SERVER

CROSS-REFERENCE TO RELATED APPLICATION(S)

This application is a continuation of application Ser. No. 15/255,006, entitled "DATA MINING MANAGEMENT SERVER, filed in the U.S. Patent and Trademark Office on Sep. 1, 2016, which claims the benefit under 35 U.S.C. § 119(e) of a U.S. Provisional application entitled "DATA MINING MANAGEMENT SERVER" filed in the U.S. Patent and Trademark Office on Sep. 1, 2015, and assigned Application No. 62/213,063, the entire disclosure of which is hereby incorporated by reference.

TECHNICAL FIELD

The present disclosure relates to a data mining management server and system and relates to a controlled system. More particularly, the present disclosure relates to a data mining management server/system that manages the outputs of a population of individuals developed at least in part by a machine learning data mining system and relates to a controlled system that receives outputs of the data mining management server/system in dependence upon the outputs of the population of the individuals.

BACKGROUND

In many environments, a large amount of data can be or has been collected which records experience over time within the environment. For example, a healthcare environment may record clinical data, diagnoses and treatment regimens for a large number of patients, as well as outcomes. A Smart Electrical Grid environment might record information about the behaviors of suppliers and consumers. A business environment may record customer information such as who they are and what they do, and their browsing and purchasing histories in order to target advertisements or predict future transactions. A computer security environment may record a large number of software code examples that have been found to be malicious. A financial asset trading environment may record historical price trends and related statistics about numerous financial assets (e.g., securities, indices of stock markets such as stock price, currencies) over a long period of time (e.g., moving average of a stock price over 30 minutes. Despite the large quantities of such data, or perhaps because of it, deriving useful knowledge from such data stores can be a daunting task.

The process of extracting patterns from such data sets is known as data mining. Many techniques have been applied to the problem, but the present discussion concerns a class of techniques known as genetic algorithms. Genetic algorithms can be applied to all of the above-mentioned environments.

Evolutionary algorithms, which are supersets of Genetic Algorithms, are good at traversing chaotic search spaces. According to Koza, J. R., "Genetic Programming: On the Programming of Computers by Means of Natural Selection", MIT Press (1992), incorporated by reference herein, an evolutionary algorithm can be used to evolve complete programs in declarative notation. The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment. A fitness function may be defined by the degree to which an evolving rule set is successfully negotiating the environment. A fitness function is thus used for evaluating the fitness of each individual in the environment. A procreation function generates new individuals by mixing rules with the fittest of the parent individuals. In each generation, a new population of individuals is created.

At the start of the evolutionary process, individuals constituting the initial population are created randomly, by putting together the building blocks, or alphabets, that form an individual. In genetic programming, the alphabets are a set of conditions and actions making up rules governing the behavior of the individual within the environment. Once a population is established, it is evaluated using the fitness function. Individuals with the highest fitness are then used to create the next generation in a process called procreation. Through procreation, rules of parent individuals are mixed, and sometimes mutated (i.e., a random change is made in a rule) to create a new rule set. This new rule set is then assigned to a child individual that will be a member of the new generation. In some incarnations, known as elitist methods, the fittest members of the previous generation, called elitists, are also preserved into the next generation.

After evolution, a typical evolutionary algorithm system will yield a set of at least two individuals, each of which has performed well during their fitness evaluations. In some evolutionary algorithm systems they all represent different solutions to the same problem. In such evolutionary algorithm systems all the resulting individuals take the same set of inputs, and assert the same set of outputs, though the rules by which they assert an output based on the inputs may be different. In other evolutionary algorithm systems some portion of the resulting individuals solves a different problem than others, for example they assert a different set of outputs based on the same set of inputs. For example they may all take temperature and time-cost-of-energy as inputs, but some may assert a signal to control an electric heater whereas others assert a signal to control a gas furnace. In such evolutionary algorithm systems the different individuals might have been evaluated with different fitness functions, each designed to encourage optimum control of the respective heating system (i.e., the gas furnace, and electric heater). In yet other evolutionary algorithm systems, different subsets of the individuals may take different sets of inputs into account, though they may assert the same outputs. This type of system might result from a class-based evolution process, in which different subsets of indicators are provided as inputs to different subsets of individuals being evaluated, though the fitness function used to evaluate them is the same. In yet other systems, the individuals are all trained on the same set of inputs and assert the same outputs, but they are deployed in different environments, so that in operation they receive different values on their inputs. This might be case, for example, where a set of individuals are evolved for controlling electrical appliances of a household, but the identical set is deployed to multiple households. Still further systems can have combinations of the above variations.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least some of the above-mentioned problems and/or disadvantages and may provide certain advantages described below. This summary describes aspects of the invention only roughly, the actual scope of the invention is described in the claims. Accordingly, an aspect of the present disclosure is to provide a computer-implemented data mining management system for outputting an action signal to a controlled system, a non-transitory computer readable storage medium impressed with computer instructions to output the action signal to the controlled system, and a computer-implemented controlled system for receiving the actions signals from the data mining management system.

In accordance with an aspect of the present disclosure, the computer-implemented data mining management system for outputting the action signal to the controlled system including a portion is provided. The portion includes a corresponding set of at least one object to be controlled. Specifically, the computer-implemented data mining management system includes a memory storing a population of individuals to be deployed to a production environment as an actor, the individuals having been developed at least in part by a machine learning data mining system, wherein: each respective one of the individuals has a rule associated therewith, the rule being for asserting an action in dependence upon production data; and the actor (i) includes one or more of the individuals, (ii) is associated with the portion of the controlled system and (iii) is configured to transmit an intermediate action signal for asserting the action. Further, the computer-implemented data mining management system includes a management server having a management rule set accessible thereto, the management server being configured to: receive the intermediate action signal from the actor for asserting the action to the portion of the controlled system associated with the actor; select, from a set of available operations, a selected operation to perform with respect to the received intermediate action signal, the selected operation being selected in dependence upon the management rule set accessible to the management server, and the set of available operations including an allowance of the received intermediate action signal and a blocking of the received intermediate action signal; in response to the selected operation being the allowance of the received intermediate action signal, transmit the received intermediate action signal as the action signal to the portion of the controlled system to control the corresponding set of at least one object; and in response to the selected operation being the blocking of the received intermediate action signal, block the received intermediate action signal from being received by the portion of the controlled system as the action signal.

In accordance with another aspect of the present disclosure the non-transitory computer readable storage medium impressed with the computer instructions to output the action signal, from the data mining management system including the memory and the management server having a management rule set accessible thereto, to a controlled system including the portion including a corresponding set of at least one object to be controlled is provided. The memory of the data mining management system stores a population of individuals to be deployed to a production environment as an actor, the individuals having been developed at least in part by a machine learning data mining system, wherein: each respective one of the individuals has a rule associated therewith, the rule being for asserting an action in dependence upon production data; and the actor (i) includes one or more of the individuals, (ii) is associated with the portion of the controlled system and (iii) is configured to transmit an intermediate action signal for asserting the action. Further, the instructions, when executed on a processor of the management server, implement a method including receiving the intermediate action signal from the actor for asserting the action to the portion of the controlled system associated with the actor, selecting, from a set of available operations, an operation to perform with respect to the received intermediate action signal, the selected operation being selected in dependence upon the management rule set accessible to the management server, and the set of available operations including an allowance of the received intermediate action signal and a blocking of the received intermediate action signal, in response to the selected operation being the allowance of the received intermediate action signal, transmitting the received intermediate action signal as the action signal to the portion of the controlled system to control the corresponding set of at least one object, and in response to the selected operation being the blocking of the received intermediate action signal, blocking the received intermediate action signal from being received by the portion of the controlled system.

In accordance with another aspect of the present disclosure, the computer-implemented controlled system for receiving the action signals from the data mining management system is provided. Specifically, the computer-implemented controlled system includes one or more portions, each portion of the one or more portions including a corresponding set of at least one object to be controlled, wherein each portion of the one or more portions receives, from a management server of the data mining management system, an action signal for asserting one or more actions to control at least one object of the corresponding set of at least one object, wherein the data mining management system includes a memory storing a population of individuals to be deployed to a production environment as one or more actors, the individuals having been developed at least in part by a machine learning data mining system, wherein each respective one of the individuals has one or more rules associated therewith, the one or more rules being for asserting the one or more actions in dependence upon production data, wherein each respective one of the one or more actors (i) includes one or more of the individuals, (ii) is associated with a particular portion of the one or more portions of the controlled system and (iii) is configured to transmit an intermediate action signal for asserting the one or more actions, and wherein the management server has a management rule set accessible thereto. Further, the management server is configured to receive the intermediate action signal from each particular one of the one or more actors for asserting the one or more actions to the particular portion of the controlled system associated with the particular actor, select, from a set of available operations, a selected operation to perform with respect to each received intermediate action signal, the selected operation being selected in dependence on the management rule set accessible to the management server, and the set of available operations including an allowance of the respective received intermediate action signal and a blocking of the respective received intermediate action signal, in response to the selected operation being the allowance of the respective received intermediate action signal, transmit the respective received intermediate action signal as the action signal to the particular portion of the controlled system associated with the particular actor to control the corresponding set of at least one object of the particular portion, and in response to the selected operation being the blocking of the respective received intermediate action signal, block the respective received intermediate action signal from being received by the particular portion of the controlled system associated with the particular actor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a surface" may include reference to one or more of such surfaces.

FIGS. 1-5, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

In all of the above scenarios, the different deployed individuals are not necessarily aware of each other. As a result, while acting entirely optimally for itself, some of the individuals may be acting at cross-purposes with others when viewed in a larger context. For example, in the real time control of a local electrical grid, a set of individuals (referred to herein as an "actor") may have been evolved to run a home automation system. Each individual actor's optimization functions have the overall goal to keep the home's electric bill as low as possible. Given that the price of electricity is higher at some times than others when electricity is needed, the actor has evolved to use electricity if possible when the price is lower. In this system each actor has no knowledge of what the other actors are doing, which can lead to problems. For example, if the price of electricity drops at 9 PM for all the homes to which the actor is deployed, each home actor may decide at 9 PM to turn on the hot water heater in the house, thereby causing problems with the overall electric grid. In an aspect of the invention, a management server is provided in order to enable groups of these independent actors to work in unison to achieve a meta-goal of which the actors themselves are not aware.

The parts of the control system include:
  A list of pairings of the deployed actor and the manager of the live data, based on which the actor will evaluate its rules and produce actions.
  A system to provide real time data to the actor specific to the object.
  A management server to evaluate all the actions generated by the actors in the list and block, allow or modify the actions based on its own rule set.

Thus in the above home automation example the management server may have a rate limiting rule which would only allow a certain percentage of actor/object pairs to turn on the hot water heater in each time increment. It communicates back to the actor that the action was blocked. Then in the next time interval if that rule to turn on the appliance fired again, the management server evaluates it again. So in this example if a particular actor's rule involved performing the action between 9 PM and 10 PM it is possible that the action, turning on the hot water heater, would never be allowed through. The management server can deploy multiple actors and apply per actor rules. For example a management server might have actors for apartments, detached houses, office building. Each class can have its own set of rules that are applied only to that class. An example would be an actor who was assigned to control a critical infrastructure class such as hospitals, police station and fire stations, might still have the rule to turn on the hot water heater at 9 PM but where a house would get delayed if the grid was at 60% usage the class containing the hospital would only get delayed if the grid was at 90% usage. It is important to remember that each actor has its own set of rules and actions, the management server only regulates whether those rules are allowed to be executed and can apply different constraints to each class, while also having a master class rule set. In the power grid example a hospital's class settings may allow for the hot water heater to be turned on but the master class rule that at no time should more than 90% of the maximum output of the gird be used would cause that rule to be blocked.

Figure 1:
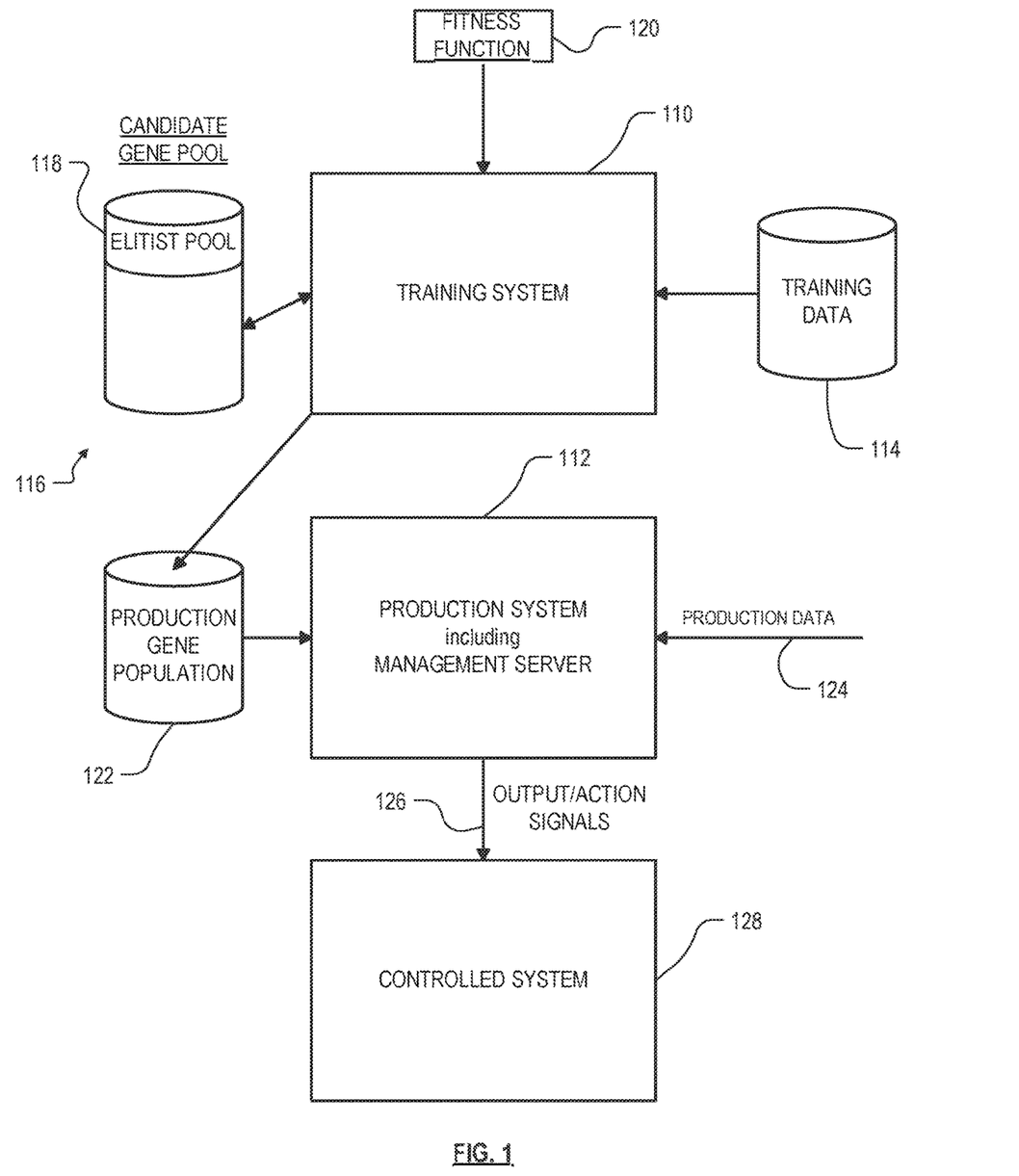
FIG. 1 is an overall diagram of an embodiment of a data mining system incorporating features of the invention.

U.S. Pat. No. 8,909,570, entitled "DATA MINING TECHNIQUE WITH EXPERIENCE-LAYERED GENE POOL" ("the '570 patent"), incorporated by reference herein, provides one context for implementation of the invention. FIG. 1 of the '570 patent is reproduced as FIG. 1 herein, with some modifications in order to highlight aspects of the present invention.

FIG. 1 herein illustrates an overall diagram of a data mining system incorporating features of the invention. The system is divided into three portions, a training system 110, a production system 112, and a controlled system 128. The training system 110 interacts with a training database 114 containing training data, as well as with another database, such as a candidate gene pool 116 containing the candidate gene pool. As used herein, the term "database" does not necessarily imply any unity of structure. For example, two or more separate databases, when considered together, still constitute a "database" as that term is used herein. The candidate gene pool database 116 includes a portion containing the elitist pool 118. The training system 110 operates according to a fitness function 120, which indicates to the training system 110 how to measure the fitness of an individual. The training system 110 optimizes for individuals that have the greatest fitness, however fitness is defined by the fitness function 120. The fitness function 120 is specific to the environment and goals of the particular application. For example, the fitness function 120 may be a function of the predictive value of the individual as assessed against the training data—the more often the individual correctly predicts the result represented in the training data, the more fit the individual is considered. In a home automation system an individual might provide signals to turn on or off a furnace, hot water heater, air conditioner, dishwasher, lights, etc., and fitness may be measured by the individual's ability to reduce the overall electric bill. In the healthcare domain, an individual might propose a diagnosis based on a patient's prior treatment and current vital signs, and fitness may be measured by the accuracy of that diagnosis as represented in the training data. As used herein, fitness may also include other target characteristics, such as diversity of candidate individuals.

Though the embodiment of FIG. 1 uses a genetic algorithm to develop individuals for deployment as actors, it will be appreciated that another embodiment could use other mechanisms to develop the actors.

The production system 112 operates according to a production gene population in another database, such as a production gene population database 122. The production gene population can be individuals from the candidate gene pool database 116 having higher fitness based on the fitness function 120. The production system 112 applies the production gene population to production data 124, and produces an output/action signal 126. In the home automation example the production data 124 may include real time temperatures inside the house and outside the house, a thermostat setting established by the resident, real time temperature of the water in the hot water tank, real time demand for hot water, an indication from the dishwasher about how full it is, current time-of-day, previous actions and demands, data that is dependent on previous information provided from a controlled system 128 or the production system (management server) 112, and so on. The output/action signal 126 of the production system 112 may include the control signals to operate the individual appliances. Thus there may be a separate instantiation of production system 112 (or parts of it) for each home. Each separate instantiation of the production system 112 may have separate local copies of the production gene population database 122, or in some embodiments each separate instantiation of the production system 112 (or some of them) may share access to a (common) production gene population database 122. In the healthcare domain, the production data 124 may be current patient data, and the output/action signal 126 of the production system 112 may be a suggested diagnosis or treatment regimen that one or more of the individuals in production gene population of the production gene population database 122 outputs in response to the production data 124. The production gene population of the production gene population database 122 is harvested from the training system 110 once or at intervals, depending on the embodiment. Preferably, only individuals from the elitist pool 118 are permitted to be harvested. In an embodiment, further selection criteria is applied in the harvesting process. Such further selection criteria may for example involve reference to the fitness trial histories of the individuals in the pool, and/or ancestry count.

The management server is included as part of the production system 112.

The controlled system 128 is a system that is controlled automatically by the output/action signal 126 from the production system 112. In the home automation system, the controlled system 128 may be one or more of the above-listed appliances.

Figure 2A:
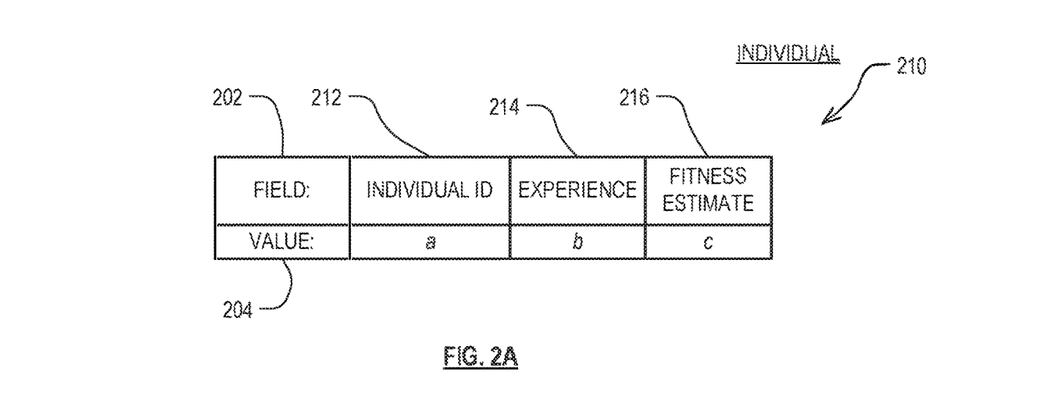
FIGS. 2A and 2B are symbolic drawings of an individual in either the candidate gene pool or the production gene population of FIG. 1.
Figure 2B:
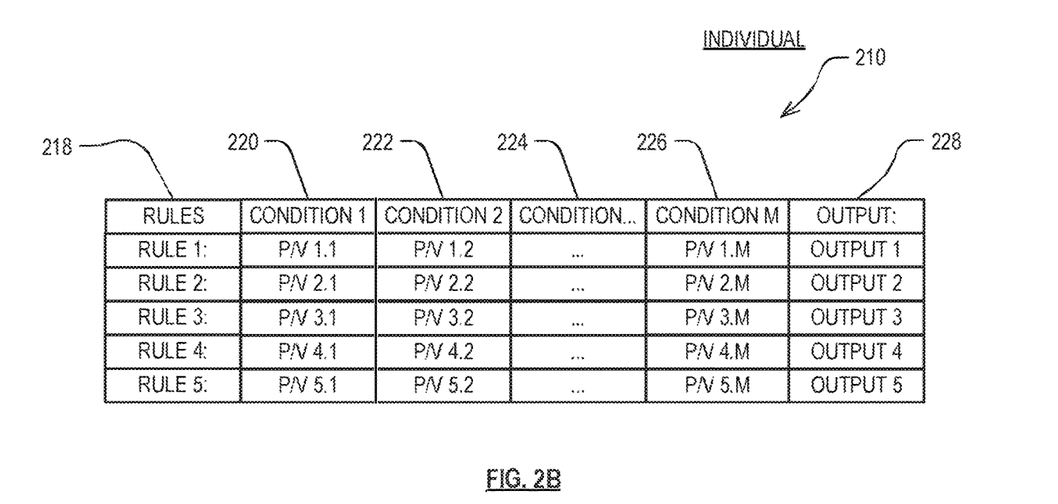

FIGS. 2A and 2B are symbolic drawings of various aspects/contents of an individual 210 in either the candidate gene pool of the candidate gene pool database 116 (FIG. 1) or the production gene population of the production gene population database 122 (FIG. 1). As used herein, an "individual" is defined by its contents, which are illustrated in both of FIGS. 2A and 2B.

Referring to FIG. 2A, the individual 210 identifies various fields 202 and corresponding values 204 of the various fields 202. The various fields 202 may include an individual ID 212 of the individual 210 an experience level 214 of the individual 210, and a fitness estimate 216 of the individual 210. As an example, the individual ID 212 is represented by a value 204 of "a," the experience level 214 is represented by a value 204 of "b," and the fitness estimate 216 is represented by a value 204 of "c." Each of the values 204 "a," "b," and "c," can be represented by a letter/word value, a numeric value or an alphanumeric value, or a set of such values.

Referring to FIG. 2B, the individual 210 identifies one or more "rules" 218 (e.g., rule 1, rule 2, rule 3, rule 4 and rule 5), each of which contains one or more conditions 220, 222, 224 and 226 (e.g., condition 1, condition 2, condition . . . , and condition M) and an outputs 228 (e.g., output 1, output 2, output 3, output 4 and output 5) to be asserted if all the conditions 220, 222, 224 and/or 226 on a given input sample (from training data or production data) are true. During procreation, any of the conditions 220, 222, 224 or 226 or any of the outputs 228 may be altered, or even entire rules may be replaced. The experience level 214 of the individual 210 increments by one for each sample of the training data of the training database 114 (FIG. 1) on which the individual 210 is tested, and the fitness estimate 216 of the individual 210 is determined by the fitness function 120 (FIG. 1), averaged (or otherwise combined) over the all the trials.

In the embodiment of FIGS. 2A and 2B, one of the rules 218 is a conjunctive list of indicator-based conditions in association with an output of the outputs 228. Indicators are the system inputs that can be fed to a condition. These indicators are represented in the training database 114, as well as in the production data 124 (FIG. 1). Indicators can also be introspective, for example by indicating the fitness estimate 216 of the individual 210 at any given moment. In the embodiment of FIGS. 2A and 2B, the conditions 220, 222, 224 and/or 226 of the individual 210 are all specified as parameter/value ("P/V") pairs. That is, if in the current sample, the specified parameter has the specified value (or range of values) then the condition 220, 222, 224 or 226 is true. Another embodiment can also include conditions 220, 222, 224 and/or 226 which are themselves conditioned on other items (such as other conditions in the rule or in a different rule or the result of another entire one of the rules). Yet another embodiment can also include conditions 220, 222, 224 and/or 226 or rules which are specified procedurally rather than as P/V pairs. Many other variations will be apparent. In an embodiment, all of the actions asserted by evaluation of the various rules 218 of an individual 210 are provided as outputs 228 of the individual 210. In another embodiment, the actions asserted by the various rules 218 of an individual 210 can be merged, arbitrated, or otherwise combined into a single output of the outputs 228 for the individual 210. Other variations will be apparent to a person of ordinary skill in the art.

In the home automation and energy grid embodiment, an individual 210 can be thought of as an artificial intelligence engine for control of a single home or business premises. Signals are asserted to operate appliances on the premises in accordance with the set of rules that define the individual, thereby prompting the individual 210 to assert signals to operate the appliances. The indicators on which the rules are based can be, for example, inside temperature, outside temperature, user's current thermostat setting, time-of-day, day-of-week, hot water tank water temperature, rate of outflow of water from the hot water tank, quantity of items currently in the dishwasher, and so on. The outputs of the rules are the control signals to operate the individual appliances.

In a healthcare embodiment, an individual can be thought of as a set of rules 218 predicting a patient's future state, given the patient's current and past state. The outputs 228 of the rules 218 can be proposed diagnoses or proposed treatment regimens that the individual 210 asserts are appropriate given the conditions 220, 222, 224 and/or 226 of the rules 218 of the individual 210. The indicators on which the rules 218 are based can be a patient's vital signs, and past treatment and medication history, for example. An example rule is as follows:

if pulse >=120 and 18<=blood pressure[6]<20 and temp >=104 and surgery duration <22 and clamp on artery and medication=EB45 and last medication >=60 and !white blood cell count [3]<−2.3 and ! oxygen level [1]<−1.1—>>>then thromboembolism @ prob <=0.65

Where "and" represents logical "AND" operation, and "!" represents logical "NOT" operation.

In a financial trading environment, the rules 218 could be related to directly measured values, such as stock price, calculated values such as a 30 minute moving value of a stock price, text related to the financial trading environment, temporal knowledge such as what day of the week it is, what week of the year, etc. Further, in the financial trading environment, the outputs 228 of the rules 218 could include actions, such as buy a stock, sell a stock, etc. The individual 210 or an actor including the individual 210 may have a specific goal of maximizing profit, or minimizing risk with reasonable profit, etc. An example of such an application is that an individual 210 of an actor is associated with an object, such as a particular stock or multiple stocks.

In a business/retail environment, the rules 218 could be related to directly measured values, such as a current price of a specific product, calculated values such as a 30 moving value of a price of that product, as well as historical purchases of the same or similar products, text related to information regarding that product, temporal knowledge such as what day of the week it is, what week of the year, etc. Further, in the business/retail environment, the outputs 228 of the rules 218 could include actions such as advertise to consumer to purchase the product. The individual 210 or actor including the individual 210 may have a specific goal of getting a good deal or having the product or products available for delivery by a certain time. An example of such an application is that an individual 210 of an actor is associated with a certain product or a certain distributor, where there are several actors associated with several products and/or distributors.

Figure 3:
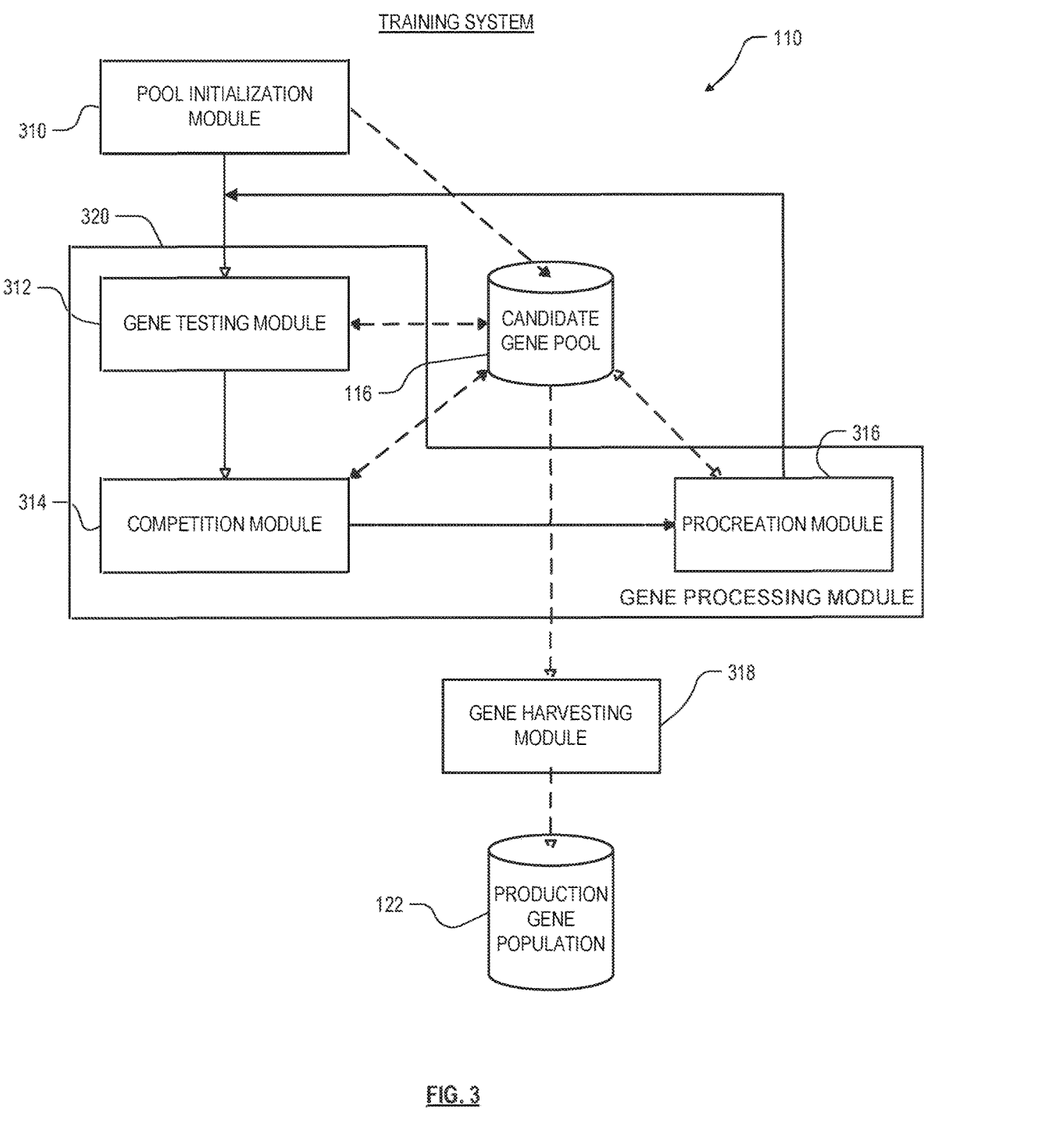
FIG. 3 illustrates modules that can be used to implement the functionality of the training system in FIG. 1.

FIG. 3 illustrates various modules in the form of blocks that can be used to implement the functionality of training system 110 (FIG. 1). The candidate gene pool of the candidate gene pool database 116 (FIG. 1) and the production gene population database 122 (FIG. 1) are also shown in the drawing. Solid lines indicate process flow, and broken lines indicate data flow. The various modules can be implemented in hardware or software, and need not be divided up in precisely the same blocks as shown in FIG. 3. Some can also be implemented on different processors or computers, or spread among a number of different processors or computers. In addition, it will be appreciated that some of the various modules can be combined, operated in parallel or in a different sequence than as shown in FIG. 3 without affecting the functions achieved. Also as used herein, the term "module" can include "sub-modules", which themselves can be considered herein to constitute modules. In particular, the gene testing module 312, competition module 314, and procreation module 316 are also considered herein to be sub-modules of a gene pool processor module 320. The blocks in FIG. 3 designated as modules can also be thought of as flowchart steps in a method.

Referring to FIG. 3, the candidate gene pool of the candidate gene pool database 116 is initialized by pool initialization module 310, which creates an initial set (e.g., a first generation) of candidate individuals in Lo of the candidate gene pool of the candidate gene pool database 116. These individuals can be created randomly, or in some embodiments a priori knowledge is used to seed the first generation. In another embodiment, individuals from prior runs can be borrowed to seed a new run. At the start, all individuals are initialized with an experience level of zero and a fitness estimate that is undefined.

Gene testing module 312 then proceeds to test the population in the candidate gene pool of the candidate gene pool database 116 on the training data of the training database 114 (FIG. 1). Only a subset of the population in the candidate gene pool of the candidate gene pool database 116 is tested at this point. As used herein, the term "subset", unless otherwise qualified, includes both proper and improper subsets as well as the null set. Each individual in the subset undergoes a battery of tests or trials on the training data of the training database 114, each trial testing the individual on one data sample. In one embodiment, each battery might consist of only a single trial. Preferably, however, each battery of tests is much larger, for example on the order of 1000 trials. Note there is no requirement that all individuals undergo the same number of trials.

After the tests, gene testing module 312 updates the fitness estimate 216 (FIG. 2A) associated with each individual 210 (FIG. 2A) tested. In an embodiment, the fitness estimate 216 may be an average of the results of all trials of the individual 210. In this case the "fitness estimate" 216 can conveniently be indicated by (calculated from) two numbers: a sum of performance measures of all trials of the individual 210, and a total number of trials that the individual 210 has experienced. The latter number may already be maintained as the experience level of the individual 210. The fitness estimate 216 at any particular time can then be calculated as follows:

$$\text{fitness estimate} = \frac{\sum_{i=1}^{a} \text{performance measure}_i}{n},$$

Where performance measure, is the performance measure of the individual 210 when tested on data sample I, and n is the number of data samples on which the individual 210 has been tested, given by the experience level of the individual 210. In an embodiment such as this, "updating" of the fitness estimate 216 can involve merely adding the performance measures from the most recent trials to the prior sum.

After the candidate gene pool of the candidate gene pool database 116 has been updated, a procreation module 316 evolves a random subset of individuals from the candidate gene pool of the candidate gene pool database 116. For example, only individuals in an elitist pool (e.g., a certain top percentage of individuals from the candidate gene pool of the candidate gene pool database 116, based on, for example, fitness estimate 216) are permitted to procreate. Any conventional or future-developed technique can be used for procreation. In an embodiment, conditions, outputs, or rules from parent individuals are combined in various ways to form child individuals, and then, occasionally, they are mutated. The combination process for example may include crossover—i.e., exchanging conditions, outputs, or entire rules between parent individuals to form child individuals. New individuals are placed in the candidate gene pool of the candidate gene pool database 116. Preferably, after new individuals are created by combination and/or mutation, the parent individuals are retained. In this case the parent individuals also retain their experience level and fitness estimates. In another embodiment, the parent individuals are discarded.

After procreation, gene testing module 312 operates again on the updated candidate gene pool of the candidate gene pool database 116. The process continues repeatedly.

Sometime after the top layer of the candidate gene pool of the candidate gene pool database 116, such as the elitist pool 118 is full, individuals can be harvested for use by production system 112. Gene harvesting module 318 retrieves individuals for that purpose. In one embodiment, gene harvesting module 318 retrieves individuals periodically, whereas in another embodiment it retrieves individuals only in response to user input. Gene harvesting module 318 selects only from a top layer LT, such as the elitist pool 118 and can apply further selection criteria as well in order to choose desirable individuals. For example, in one embodiment the gene harvesting module 318 selects only the fittest individuals from LT. Other criteria will be apparent to a person of ordinary skill in the art. The individuals also undergo further validation as part of this further selection criteria, by testing on historical data not part of training data of the training database 114. The individuals selected by the gene harvesting module 318 are written to the production gene population database 122 for use by production system 112 as actors. Hereinafter, the individuals selected from the gene harvesting module 318 may be identified as actors and/or individuals.

In the above-incorporated '570 patent, an experience-layered gene pool is used. That is not a requirement for all embodiments of the invention herein.

Also, the portion(s) of the training data of the training database 114 that is provided to different "classes" of candidate individuals can be different, and the fitness functions applied to evaluate the fitness of different ones of the candidate individuals can be different. Under these conditions, and even without any such differences, the individuals that evolve and are harvested can well contain different sets of rules. A system in which the invention can be used, and in which the portion of training data of the training database 114 that are provided to different "classes" of candidate individuals can be different, is described in class-based variation is described in U.S. Pat. No. 8,768,811 incorporated by reference herein.

Figure 4:
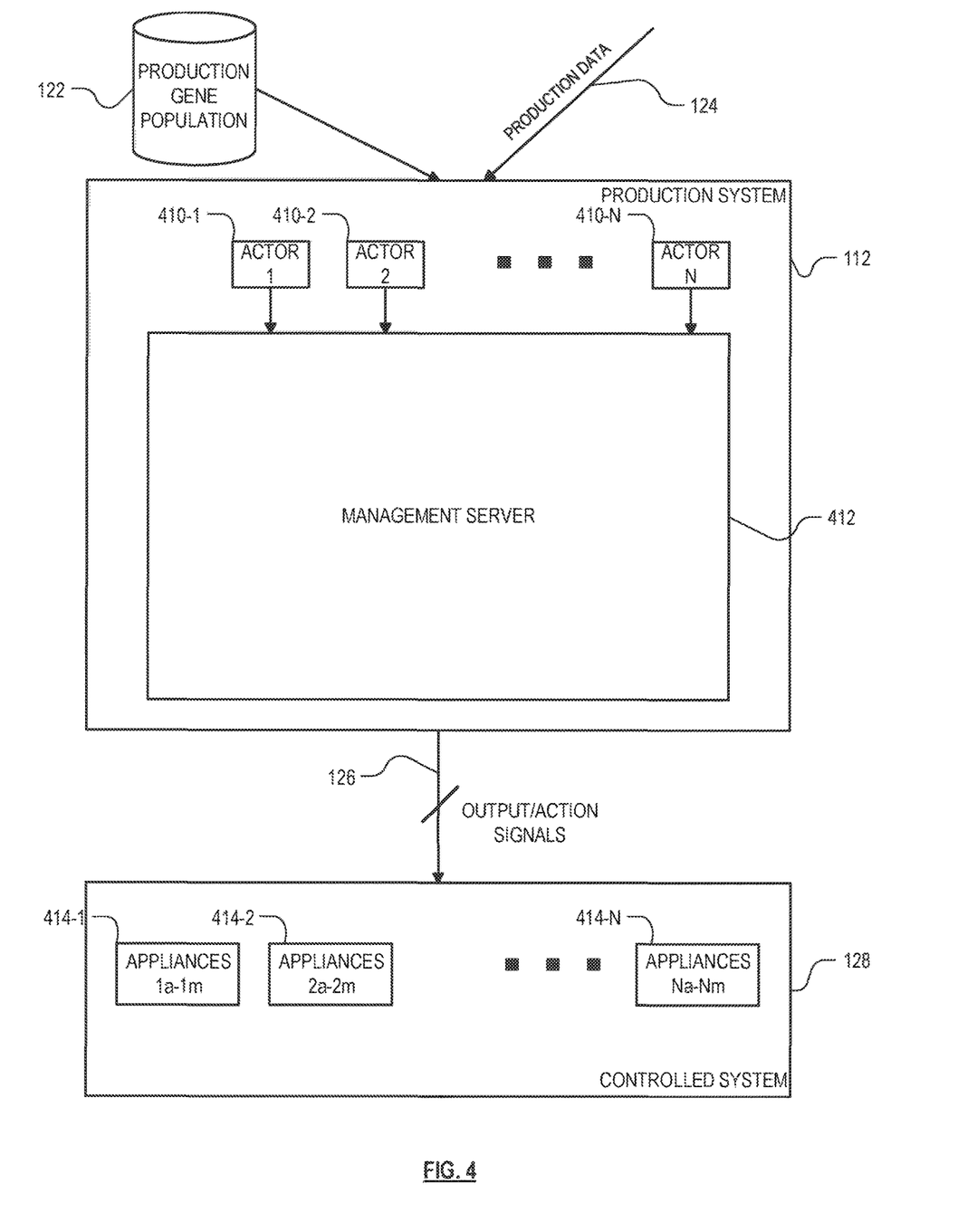
FIG. 4 illustrates the production system and the controlled system of FIG. 1.

FIG. 4 is a symbolic diagram of the production system 112 (FIG. 1) and the controlled system 128 (FIG. 1) for use in a home automation and energy grid embodiment. In this example each actor has been evolved to optimize energy usage or costs for a single premises (or portion), and a management server 412, of the production system 112, tries to achieve a meta-goal of optimizing energy usage or costs overall, a goal of which the actors themselves are not aware.

[0055] In FIG. 4, the individual actors are designated 410-1, 410-2, . . . 410-N (representatively 410). In the controlled system 128, each portion may have a number of different objects to be controlled, such as appliances. The controlled object may also be objects of a financial asset trading environment, objects related to a business environment, objects of a computer security environment, etc. For convenience, these are numbered ia-im, where 'i' is the portion number (1 through N) and the appliances at that portion are numbered 'a' through 'm' ('m' can be different at different portions). In FIG. 4, appliances 1a-1m are designated 414-1; appliances 2a-2m are designated 414-2, and so on, with appliances Na-Nm designated 414-N (representatively 414). Physically the actors 410 may be located together with the management server 412, or each may be located at the portion with which they are associated.

Each of the actors 410 is governed by one or more individuals from the production gene population of the production gene population database 122 (FIG. 1) that can be stored, for example, in a memory. Each of the individuals can be deployed to a production environment, wherein, for example, each of the individuals has been developed, at least in part by a machine learning data mining system. As described above, with reference to FIG. 1 each respective individual has a rule associated therewith, where the rules is for asserting an action in dependence upon production data 124.

Each of the actors 410 can include multiple individuals, where each of the actors 410 is associated with a single portion of the controlled system 128, such that actor 410-1 is associated with one portion, which includes appliances 1a-1m 414-1. Further, each of the actors 410 receives inputs (indicators, production data 124 (FIG. 1)) from its associated portion, and asserts outputs, such as an intermediate action signal for asserting an action, based on its own internal set of rules. Instead of directly controlling the appliances 414, however, the outputs from the actors 410 are provided to the management server 412, which applies its own supervisory rules from a management rule set, for example. The management server 412 then asserts the output/action signal 126 that actually controls the appliances 414 at each portion. Note that since the appliances 414 are typically located at the individual portions, the output/action signal 126 actually contains multiple signal lines in this embodiment.

The management server 412 includes a rule engine to evaluate all the actions/outputs (e.g., the outputs 228 of FIG. 2A) generated by the actors 410 and block, allow or modify the actions/outputs (e.g., the outputs 228 of FIG. 2A) based on a management rule set of the rule engine. The management rule set is put into place to, for example, properly manage the demands of the energy grid or properly manage risk/profit scenarios in a financial assets environment. The management server 412 may receive the intermediate from one of the actors 410 for asserting the action to the appropriate portion of the controlled system 128 that is associated with the one of the actors 410. Further, the management server may select, from a set of available operations, a selected operation to perform with respect to the received intermediate action signal, where the selected operation is selected in dependence upon the management rule set that is accessible to the management server, and where the set of available operations incudes, as mentioned above, an allowance of the received intermediate action signal, a blocking of the received intermediate action signal and a modification of the intermediate action signal.

In response to the selected operation being the allowance of the received intermediate action signal, the management server 412 transmits the received intermediate action signal as the output/action signal 126 to the portion of the controlled system 128 to control the appropriate set of appliances. Further, in response to the selected operation being the blocking of the received intermediate action signal, the management server 412 blocks the received intermediate action signal from being received by the appropriate set of appliances. Additionally, in response to the selected operation being the modification of the received intermediate action signal, the management server 412 (i) modifies a control characteristic of the received intermediate action signal to obtain a modified received intermediate action signal and (ii) transmits the modified received intermediate action signal as the output/action signal 126 to the portion of the controlled system 128 to control the appropriate set of appliances. A control characteristic may be any action or portion of an action which is intended to be controlled by the intermediate action signal.

In an implementation the received intermediate action signal is modified by at least one of (i) allowing some sub-actions of the received intermediate action signal to be transmitted to the portion of the controlled system 128 and blocking other sub-actions of the received intermediate action signal from being received by the portion of the controlled system 128, (ii) allowing some of the sub-actions or all of the sub-actions of the received intermediate action signal to be transmitted to the portion of the controlled system 128 with a shift in time, and (iii) allowing some of the sub-actions or all of the sub-actions of the received intermediate action signal to be transmitted to the portion of the controlled system 128 with a change in amplitude or frequency. The shift in time can be a reverse shifting in time or a forward shifting in time, such that if the controlled system 128 was initially supposed to perform an action at 9 PM, the modification of the intermediate actin signal may result in an output/action signal 126 that causes one of the appliances to perform the intended action at 8:30 PM or at 9:30 PM. The changing of the amplitude or frequency of the sub-actions can be, for example, in the realm of home automation and energy grid management, slightly reducing or increasing the temperature of the hot water heater from the initial temperature reflected by the intermediate action signal or slightly reducing or increasing the frequency at which the hot water heater is adjusted.

In the home automation and energy grid embodiment, the management server 412 has a rate limiting rule which allows only a certain percentage of actor/appliance pairs at any given time or portion of time to turn on the hot water heater in each time increment (each half hour, for example). This certain percentage can be a predefined percentage, where the predefined percentage can vary upon other constraints and/or feedback received from the controlled system 128. The management server 412 communicates back to the one of the actors 410 that its action was blocked. Then in the next time interval, if that rule to turn on the appliance 414 fires again, the rule would be evaluated again by the management server 412. This predefined percentage can also be used to modify the intermediate action signal, rather than just completely blocking the intermediate action signal. So in this example if a particular actor's rule called for the action to be performed only between 9 PM and 10 PM it is possible that the rule would never be allowed through. On the other hand, the management server 412 might allow the action to be performed in the 9:30 pm-10:00 pm time slot even though it was first asserted in the 9:00 pm-10:00 pm time slot, thereby furthering the meta-goal of optimizing energy usage or costs overall. It can be appreciated that sometimes meta-goals have to be made subservient to other meta-goals. In the electrical grid example, while it may not be a serious problem that the management server prevents the dishwasher from running at all one night, but it could be a serious problem if the management server prevents an air conditioner from turning on when an elderly resident urgently needs it to avoid heat stroke. In other environments there may be other needed adaptations, such as fairness among the actors in how they are treated by the management server. All these types of meta-goals can be incorporated into the rules for management server 412. The rules in the management server 412 are, in one embodiment, created manually. In another embodiment one or more of them are evolved by an evolutionary algorithm.

Each of the above-described appliances can be assigned a priority, such as high priority, medium priority and low priority. Based on the assigned priority the management server 412 can determined whether to allow, block and/or modify the intermediate action signal. For example, if there are competing intermediate action signals from different actors 410, the management server 412 will give preference to intermediate action signals associated with higher priority appliances. These priorities can be assigned to the appliances based on one or more factors. For example one factor may be the class of the corresponding portion of the controlled system 128 and another factor may be the type of action asserted by the intermediate action signal. For example, a class can be any one of high priority class, intermediate priority class, low priority class or critical class, semi-critical class and non-critical class. As previously discussed, a portion of the controlled system 128 that is a hospital could be identified as a critical class, a portion of the controlled system 128 that is a school may be identified as a semi-critical class, a portion of the controlled system 128 that is elderly residential may be identified as a semi-critical class and a portion of the controlled system 128 that is normal residential can be identified as a non-critical class. As another example, the class can be related to different sectors of the portion of the controlled system 128, such as a type of business in general or the type of business on a micro-level. The classes of the portions may change based on time of day, day of year and other environmental conditions, etc. The type of action can similarly be identified as, for example, critical, sub-critical and non-critical based on the amount of bandwidth of the entire grid consumed by the action (e.g., high bandwidth action, intermediate bandwidth action and low bandwidth action) or based on whether the action to be asserted is to start a dishwasher in the evening which is a non-critical action or to turn on the heat when the exterior temperature is below freezing which is a critical action. A person of ordinary skill in the art will understand that the class of the portion and the type of action can be set, determined, identified and adjusted based on any reasonable type of information that can be extracted from any aspect of the portion of the controlled system 128 and the type of action that is to be performed. Further, information based on a combination of the class and type of action can be combined and analyzed by the management server 412 to determine whether to allow, block or modify the intermediate action signal and/or to adjust the priority of certain appliances within a certain portion of the controlled system 128 or the priority of an entire portion of the controlled system 128.

The management server 412 may adjust the priority of each individual appliance or an entire portion of the controlled system 128 based on historical selections of blocking, allowing and/or modifying the intermediate action signal (e.g., what was done to the most recent intermediate action signal). For example, if an intermediate action signal for a particular portion has been block three evenings in a row, then the priority can be temporarily increases from low priority to medium priority. A person of ordinary skill in the art can easily understand the multitude of combinations of increasing and/or decreasing priority based on historical operations performed by the management server 412.

The management server 412 may also assign the priority to appliances or an entire portion based on a separate, non-adjustable rating, such as a master criticality rating. Regarding the hospital discussed above, it may be appropriate for the hospital to have a top level master critically rating that prohibits any intermediate action signal intended for certain appliances of the hospital to never be blocked or modified.

As briefly mentioned above, the management server 412 is capable of providing feedback to the actors 410 to let the actors 410 know whether their corresponding intermediate action signal has been block, allowed or modified. This feedback can then be used by the individuals of the actors 410 to adjust their individual rules or to influence their future behavior based on internals and/or external conditions.

Note that in some embodiments, some of the production data 124 upon which the rules in the individual actors 410 base their outputs can be provided by the management server 412 rather than from local sensors. For example, the management server 412 may be aware that, for some reason, energy is less expensive and more plentiful at the portion associated with a first subset of the actors 410 than with a second subset of the actors 410. Furthermore, the individuals controlling the actors 410 may have been evolved to respond to an input which indicates the cost of energy. In this case the management server 412 can provide input values to each of the actors 410 indicating the actual cost of energy at the portion associated with each of the actors 410. As another example, the management server 412 may use the same signal to allow for more air conditioner running time on days when the ambient temperature is higher than when it is lower. Thus this arrangement effectively allows the management server 412 to scale or otherwise alter the operation of particular actors 410 based on meta-information.

The management server 412 may also implement a sorting rule, in which actions asserted by the actors 410 are sorted based on some factor relevant to the domain/environment, such as medical necessity. This, too, can address the risk that a medically necessary action asserted by an actor 410 otherwise might be blocked by the management server 410.

It can be seen that in embodiments of the invention, the actors 410 are autonomous in the sense that they make their own decisions in pursuit of their own goals, unaware of the decisions being made by other actors in the overall system. But the actions asserted by the actors 410 are intercepted by the management server 412, which modifies or blocks them in order to impose a supervisory level of rules in pursuit of meta-goals desired for the operation of the entire system. Only the actions asserted by the management server 412 are sent to the controlled system 128 for execution.

Figure 5:
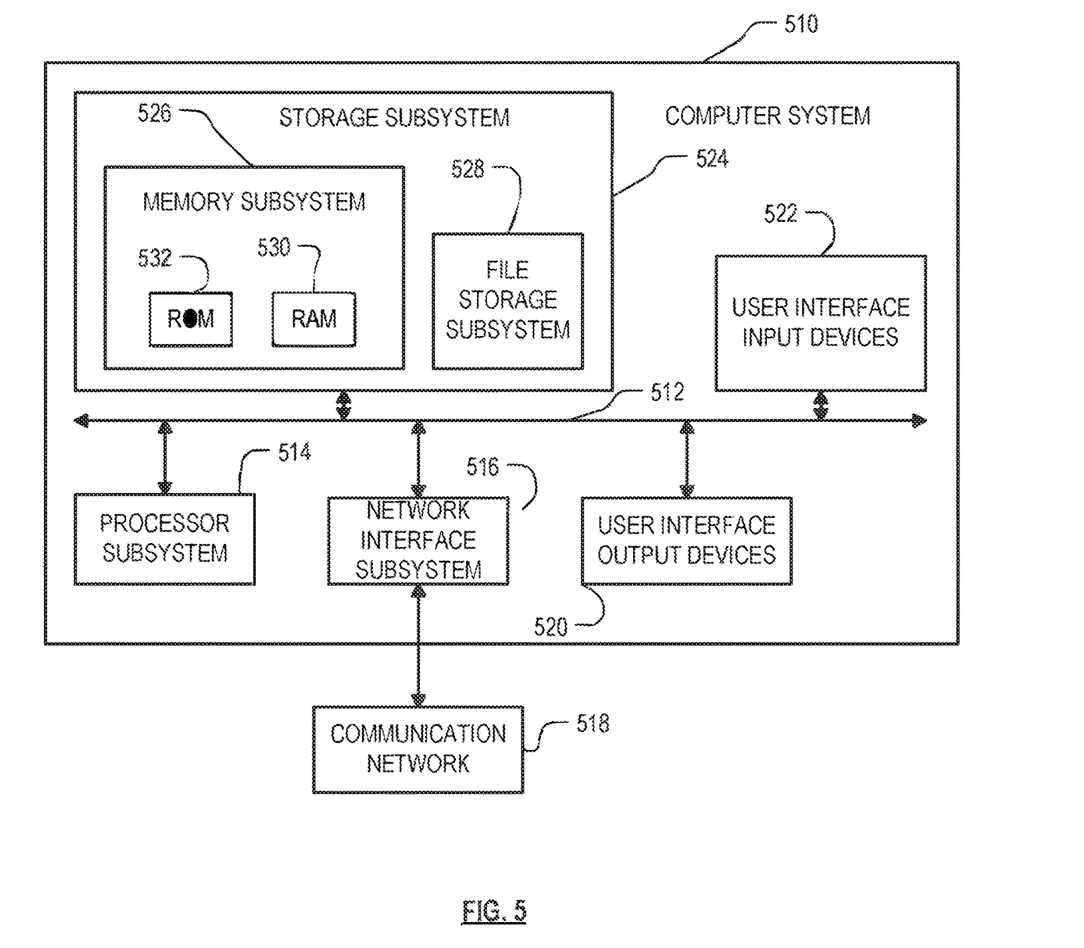
FIG. 5 is a simplified block diagram of a computer system that can be used to implement either or all of the training system, the production system and the controlled system in FIG. 1.

FIG. 5 is a simplified block diagram of a computer system 510 that can be used to implement the training system 110 (FIG. 1), the production system 112 (FIG. 1), the management server 412 (FIG. 4), and/or any of the actors 410 (FIG. 4) to the extent they are hosted on different computer systems.

Computer system 510 typically includes a processor subsystem 514 which communicates with a number of peripheral devices via bus subsystem 512. These peripheral devices may include a storage subsystem 524, comprising a memory subsystem 526 and a file storage subsystem 528, user interface input devices 522, user interface output devices 520, and a network interface subsystem 516. The input and output devices allow user interaction with computer system 510. Network interface subsystem 516 provides an interface to outside networks, including an interface to communication network 518, and is coupled via the communication network 518 to corresponding interface devices in other computer systems. The communication network 518 may comprise many interconnected computer systems and communication links. These communication links may be wireline links, optical links, wireless links, or any other mechanisms for communication of information. While in one embodiment, the communication network 518 is the Internet, in other embodiments, communication network 518 may be any suitable computer network.

Physical hardware components of network interfaces of the network interface subsystem 516 are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system 510.

The user interface input devices 522 may include a keyboard, pointing devices such as a mouse, a trackball, a touchpad, or a graphics tablet, a scanner, a touch screen incorporated into a display, audio input devices such as voice recognition systems, microphones, and other types of input devices. In general, use of the term "input device" is intended to include all possible types of devices and ways to input information into computer system 510 or onto the communication network 518. In particular, it is intended to include sensors from which an actor 410 receives indicator values relied upon by its rules.

The user interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system. In particular, an output device of the computer system 510 on which the production system 112 is implemented, may include a visual output informing a user of action recommendations made by the system, or may include a communication device for communicating action signals to the management server 412. Additionally or alternatively, the communication network 518 may communicate action signals to the management server 412.

The storage subsystem 524 stores the basic programming and data constructs that provide the functionality of certain embodiments of the present invention. For example, the various modules implementing the functionality of certain embodiments of the invention may be stored in the storage subsystem 524. These software modules are generally executed by the processor subsystem 514. The storage subsystem 524 also stores the candidate gene pool of the candidate gene pool database 116 (FIG. 1), the training database 114 (FIG. 1), and/or the production gene population of the production gene population database 122 (FIG. 1). Alternatively, one or more of such databases can be physically located elsewhere, and made accessible to the computer system 510 via the communication network 518.

The memory subsystem 526 typically includes a number of memories including a main random access memory (RAM) 530 for storage of instructions and data during program execution and a read only memory (ROM) 532 in which fixed instructions are stored. A file storage subsystem 528 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by the file storage subsystem 528. The memory subsystem 526 contains, among other things, computer instructions which, when executed by the processor subsystem 514, cause the computer system to operate or perform functions as described herein. As used herein, processes and software that are said to run in or on "the host" or "the computer", execute on the processor subsystem 514 in response to computer instructions and data in the memory subsystem 526 including any other local or remote storage for such instructions and data.

The bus subsystem 512 provides a mechanism for letting the various components and subsystems of the computer system 510 communicate with each other as intended. Although the bus subsystem 512 is shown schematically as a single bus, alternative embodiments of the bus subsystem may use multiple busses.

The computer system 510 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of the computer system 510 depicted in FIG. 5 is intended only as a specific example for purposes of illustrating the preferred embodiments of the present invention. Many other configurations of the computer system 510 are possible having more or less components than the computer system 510 depicted in FIG. 5.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, and without limitation, any and all variations described, suggested or incorporated by reference herein are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A computer-implemented data mining management system for outputting an action signal to a controlled system, the computer-implemented data mining management system comprising:
   a memory storing a population of individuals to be deployed to a production environment as an actor, wherein:
      each respective one of the individuals has a rule associated therewith, the rule being for asserting an action in dependence upon production data, and
      the actor (i) includes one or more of the individuals, (ii) is associated with the controlled system and (iii) is configured to transmit an intermediate action signal for asserting the action; and
   a management server having a management rule set accessible thereto, the management server being configured to:
      receive the intermediate action signal from the actor for asserting the action to the controlled system associated with the actor,
      select, from a set of available operations, a selected operation to perform with respect to the received intermediate action signal, and the set of available operations including an allowance of the received intermediate action signal and a blocking of the received intermediate action signal.

2. The computer-implemented data mining management system of claim 1, wherein:
   the set of available operations includes modification of the received intermediate action signal; and
   the management server is further configured to, in response to the selected operation being the modification of the received intermediate action signal, (i) modify a control characteristic of the received intermediate action signal to obtain a modified received intermediate action signal and (ii) transmit the modified received intermediate action signal as the action signal to the controlled system to control the corresponding set of at least one object.

3. The computer-implemented data mining management system of claim 2, wherein the received intermediate action signal is modified by at least one of (i) allowing some sub-actions of the received intermediate action signal to be transmitted to the controlled system and blocking other sub-actions of the received intermediate action signal from being received by the controlled system, (ii) allowing some of the sub-actions or all of the sub-actions of the received intermediate action signal to be transmitted to the controlled system with a shift in time, and (iii) allowing some of the sub-actions or all of the sub-actions of the received intermediate action signal to be transmitted to the controlled system with a change in amplitude or frequency.

4. The computer-implemented data mining management system of claim 2, wherein the management rule set includes management rules configured to block the received intermediate action signal, allow the received intermediate action signal and modify the received intermediate action signal, such that only a predefined percentage of one or more objects of the corresponding set of at least one object can be controlled by the action signal at a given time.

5. The computer-implemented data mining management system of claim 2, wherein each object of the corresponding set of at least one object or the corresponding set of at least one object is assigned a priority according to which the received intermediate action signal is blocked, allowed and modified.

6. The computer-implemented data mining management system of claim 5, wherein the priority is assigned to each object of the corresponding set of at least one object in dependence upon at least one of a class of the corresponding set of at least one object and a type of the action asserted by the received intermediate action signal.

7. The computer-implemented data mining management system of claim 6, wherein:
   the class of the portion is assigned from a set of classes including a low priority class, an intermediate priority class and a high priority class; and
   the type of the action asserted by the received intermediate action signal is assigned from a set of types including a low bandwidth action, an intermediate bandwidth action and a high bandwidth action.

8. The computer-implemented data mining management system of claim 5, wherein the priority is assigned to each object of the corresponding set of at least one object or to the corresponding set of at least one object in dependence upon historical selections of the selected operation by the management server to block the received intermediate action signal, allow the received intermediate action signal and modify the received intermediate action signal.

9. The computer-implemented data mining management system of claim 8, wherein the management server is further configured to increase the priority assigned to an object of the corresponding set of at least one object or the corresponding set of at least one object when a most recent intermediate action signal has been blocked or modified for the object or the corresponding set of at least one object.

10. The computer-implemented data mining management system of claim 5, wherein the priority is assigned to each object of the corresponding set of at least one object or the corresponding set of at least one object in dependence upon a criticality rating of each object of the corresponding set of at least one object or the corresponding set of at least one object.

11. The computer-implemented data mining management system of claim 5, wherein the priority is assigned to each object of the corresponding set of at least one object or the corresponding set of at least one object in dependence upon at least one of a time of a day, a day of a week and a week of a year.

12. The computer-implemented data mining management system of claim 2, wherein the management server is further configured to provide feedback to the actor indicating whether the received intermediate action signal, as received from the actor, was blocked, allowed or modified by the management server.

13. The computer-implemented data mining management system of claim 12, wherein the feedback provided to the actor includes information for updating the rule associated with the one or more of the individuals associated with the actor.

14. The computer-implemented data mining management system of claim 1, wherein the management server is further configured to contribute to the production data.

15. The computer-implemented data mining management system of claim 1, wherein the production data includes at least one of (i) information upon which an operation of the controlled system is dependent upon, and (ii) information that is dependent upon the operation of the controlled system.

16. The computer-implemented data mining management system of claim 1, wherein:
the population of the individuals stored in the memory is to be deployed to the production environment by multiple actors;
the controlled system includes one or more portions, each portion of the one or more portions including a respective corresponding set of at least one object to be controlled;
each respective one of the multiple actors (i) includes one or more of the individuals, (ii) is associated with a particular portion of the one or more portions of the controlled system and (iii) is configured to transmit a respective intermediate action signal;
the management server is further configured to receive a respective intermediate action signal from each respective one of the multiple actors; and
the management server is further configured to, for each received respective intermediate action signal, select the selected operation to perform with respect to the respective intermediate action signal.

17. A non-transitory computer readable storage medium impressed with computer program instructions to output an action signal, from a data mining management system including a memory and a management server having a management rule set accessible thereto, to a controlled system including a corresponding set of at least one object to be controlled, wherein:
the memory stores a population of individuals to be deployed to a production environment as an actor, wherein:
each respective one of the individuals has a rule associated therewith, the rule being for asserting an action in dependence upon production data, and
the actor (i) includes one or more of the individuals, (ii) is associated with the controlled system and (iii) is configured to transmit an intermediate action signal for asserting the action; and
the computer program instructions, when executed on a processor of the management server, implement a method comprising:
receiving the intermediate action signal from the actor for asserting the action to the controlled system associated with the actor,
selecting, from a set of available operations, an operation to perform with respect to the received intermediate action signal, and the set of available operations including an allowance of the received intermediate action signal and a blocking of the received intermediate action signal.

18. A computer-implemented controlled system for receiving action signals from a data mining management system, the computer-implemented controlled system comprising:
one or more portions, each portion of the one or more portions including a corresponding set of at least one object to be controlled,
wherein each portion of the one or more portions receives, from a management server of the data mining management system, an action signal for asserting one or more actions to control at least one object of the corresponding set of at least one object,
wherein the data mining management system includes a memory storing a population of individuals to be deployed to a production environment as one or more actors,
wherein each respective one of the individuals has one or more rules associated therewith, the one or more rules being for asserting the one or more actions in dependence upon production data,
wherein each respective one of the one or more actors (i) includes one or more of the individuals, (ii) is associated with a particular portion of the one or more portions of the controlled system and (iii) is configured to transmit an intermediate action signal for asserting the one or more actions,
wherein the management server has a management rule set accessible thereto, and wherein the management server is configured to:
receive the intermediate action signal from each particular one of the one or more actors for asserting the one or more actions to the particular portion of the controlled system associated with the particular actor;
select, from a set of available operations, a selected operation to perform with respect to each received intermediate action signal, and the set of available operations including an allowance of the respective received intermediate action signal and a blocking of the respective received intermediate action signal.

* * * * *